United States Patent [19]
Zins et al.

[11] Patent Number: 6,103,325
[45] Date of Patent: Aug. 15, 2000

[54] ULTRASONICALLY BONDED SEAM IN AN AUTOCLAVABLE FABRIC

[75] Inventors: Howard M. Zins, Manchester, Mo.; David C. Holland, Savannah, Tenn.

[73] Assignee: Angelica Corporation, Chesterfield, Mo.

[21] Appl. No.: 08/228,086

[22] Filed: Apr. 15, 1994

[51] Int. Cl.[7] .............................. B32B 3/00; B32B 31/20
[52] U.S. Cl. .................... 428/36.1; 156/73.1; 442/164
[58] Field of Search .................. 156/73.1; 428/36.1, 428/287; 442/164

[56] References Cited

U.S. PATENT DOCUMENTS

| | | | |
|---|---|---|---|
| 3,483,073 | 12/1969 | Pounder et al. | 428/198 |
| 3,677,861 | 7/1972 | Knauf | 156/73.2 |
| 3,734,805 | 5/1973 | Obeda et al. | 156/580 |
| 3,884,738 | 5/1975 | Hofius, Sr. | 156/73.1 |
| 4,090,897 | 5/1978 | Minick | 156/73.1 |
| 4,196,562 | 4/1980 | Hirschman | 156/217 |
| 4,272,851 | 6/1981 | Goldstein | 2/79 |
| 4,305,988 | 12/1981 | Kocher | 428/158 |
| 4,311,540 | 1/1982 | Hill | 156/73.1 |
| 4,542,771 | 9/1985 | Payet et al. | 139/302 |
| 4,605,454 | 8/1986 | Sayovitz et al. | 156/73.1 |
| 4,683,593 | 8/1987 | Langley | 2/82 |
| 4,686,136 | 8/1987 | Homonoff et al. | 428/286 |
| 4,938,817 | 7/1990 | Langley | 156/73.1 |
| 5,003,902 | 4/1991 | Benstock et al. | 112/418 |
| 5,087,320 | 2/1992 | Neuwirth | 156/580.2 |
| 5,171,387 | 12/1992 | Wuchinich | 156/73.3 |
| 5,209,880 | 5/1993 | Miwa | 264/23 |
| 5,215,609 | 6/1993 | Sanders | 156/70 |
| 5,298,303 | 3/1994 | Kerr et al. | 428/287 |

*Primary Examiner*—Robert Dawson
*Attorney, Agent, or Firm*—Howell & Haferkamp, L.C.

[57] ABSTRACT

A liquid impervious seam is formed in laminate sheet comprising polyurethane and polyester laminates, the seam being formed with ultrasonic energy and being capable of withstanding repeated sterilizations by autoclaving.

27 Claims, 1 Drawing Sheet

ULTRASONICALLY BONDED SEAM IN AN AUTOCLAVABLE FABRIC

BACKGROUND OF THE INVENTION

1) Field of the Invention

The present invention relates to a fabric seam which is impervious to fluids. The seam is ultrasonically formed in a polyurethane-polyester laminated fabric and is principally intended to be used to construct surgical, precautionary and laboratory garments. However, the present invention is equally applicable to other uses such as rainwear, tarpaulins and laundry bags. Thus, the scope of the invention covers the fabric seam, a method for making the same, and garments made with the seam.

(2) Description of the Related Art

Various prior art seams and garments have been developed to shield wearers from hazardous environments. However, with the current heightened awareness of infectious disease, such as Human Immunodeficiency Virus (HIV) and Hepatitis B Virus (HBV), spread by contact with bodily fluids, this technology is of ever-increasing importance, particularly in the field of surgical, precautionary and laboratory garments. Many operations such as cesarean sections, cardiovascular surgery, orthopedic surgery and others expose surgical staff to large quantities of bodily fluids and thereby expose them to health risks. Without proper protection, the risk of contracting infectious disease is significantly increased.

Due to the enormity of the consequences if not the magnitude of the risk, the health-care profession must have reliable protection to prevent contact with bodily fluids. Thus, the protective garments must be absolutely impervious to fluids at least in those areas of the garment likely to come into contact with bodily fluids. In addition, many tasks performed by surgical personnel are physically demanding such that large and repetitious forces are exerted upon the garments they wear. Thus, the protective garments must be fairly strong and fatigue resistant to withstand the rigors of the surgical environment.

As a practical matter, the surgical garments must be either inexpensive and disposable or capable of sterilization and re-use. In reality, protective garments which are a few times more expensive, but capable of being used many more times before being retired are more cost effective. However, in order to be reusable, the garments must be capable of sterilization. The most common method of sterilization is by steam autoclaving which subjects the garments to temperatures in excess of 275° F. Thus, the garments must be capable of withstanding a minimum of 275° F. in order to take advantage of the inherent economy of multiple usage.

In the past, some surgical garments have been developed to overcome these problems. For instance, U.S. Pat. No. 5,003,902 discloses a surgical garment constructed with stitched seams sealed with a thermo-setting adhesive in order to make them fluid-tight. By using this two-step process, garments can be made having strong, fluid-tight seams. Neither of the processes alone would produce a suitable garment. Without the stitching, the seam would not withstand the rigors of the surgical environment, and without the adhesive, the garment would not be fluid-tight.

A similar seam is disclosed in U.S. Pat. No. 4,272,851 in which the garment seams are ultrasonically sealed and then stitched for reinforcement. The end result is a disposable garment. The material used is a polyethylene-coated, nonwoven, spunbonded, olefin material. In addition, either step of the process of forming the garment used alone yields unacceptable results. The ultrasonic welding used alone produces an inferior seam having low tensile strength. Thus, reinforcement by stitching the seam is necessary. Stitching alone leaves voids in the garment at the seams, thus potentially exposing the user to fluids and health risks.

Other prior art seams have the same problems. Moreover, these problems are not limited to surgical garments. These problems exist in other applications such as raincoats, jackets, and similar outerwear as well as tents, outdoor equipment, tarpaulins and the like. Likewise, other types of garments used in other medical areas such as laboratories as well as laundry bags and other such containers all suffer from the same deficiencies and/or high costs.

SUMMARY OF THE INVENTION

The present invention overcomes the aforementioned disadvantages typically associated with prior art, fabric seams by providing a fluid-tight seam having relatively high tensile and fatigue strengths as well as high temperature capability and which can be formed in one manufacturing step. This is achieved by forming the seam by ultrasonic welding. Thus, the immediate economy of a one-step manufacturing process is realized and in addition, because of the strength and temperature capability of the seam, the garment is reusable, thereby giving the additional economy inherent in multiple usage.

The fabric is a composite made of a polyurethane laminate bonded to a polyester laminate. In the preferred embodiment, this composite is manufactured by coating polyester fabric first with a thermoplastic polyurethane interior coating, and then with a thermosetting polyurethane exterior coating by any one of several processes which are well-known in the art. In order to form a seam, sides of the fabric coated with polyurethane are brought into contact with one another and ultrasonic energy is applied to weld the fabrics together to form a seam.

Although the technology may be used in manufacturing many different types of articles such as raingear, tarpaulins or garment bags, the preferred embodiment is along the longitudinal sleeve seam in a surgical or laboratory garment. Thus employed, a fluid-tight seam is produced which shields the wearer from bodily-fluid-borne disease at a relatively low cost.

BRIEF DESCRIPTION OF THE DRAWING FIGURES

Further objects and features of the present invention are revealed in the following detailed description of the preferred embodiment of the invention and in the drawing figures wherein.

DESCRIPTION OF THE PREFERRED EMBODIMENT

The ultrasonically bonded seam of the present invention constructed according to the method of the present invention provides a seam that is both impervious to liquids and is sufficiently strong to stand up to repeated institutional launderings and sterilizations by a conventional autoclaving process and repeated reuse of the object constructed by the seam after sterilization. By the use of the term autoclaving herein, what is meant is the conventional process of sterilization where the object being sterilized is commonly subjected to steam heat of at least 275° F. The seam of the invention constructed according to the method of the invention yet to be described remains heat stable through several autoclaving processes, meaning that the seam will remain secure and impervious to liquids after being put through several cycles of sterilization by steam having a temperature of 275° F.

The seam of the invention constructed according to the method of the invention is described as being used in a surgical garment. However, it should be understood that this descriptive embodiment of the seam is for illustrative purposes only and is not intended to be limiting. The seam of the invention may be employed in a variety of objects where a liquid impervious seam is desired that is capable of standing up to several cycles of sterilization by autoclaving.

Figure 1:
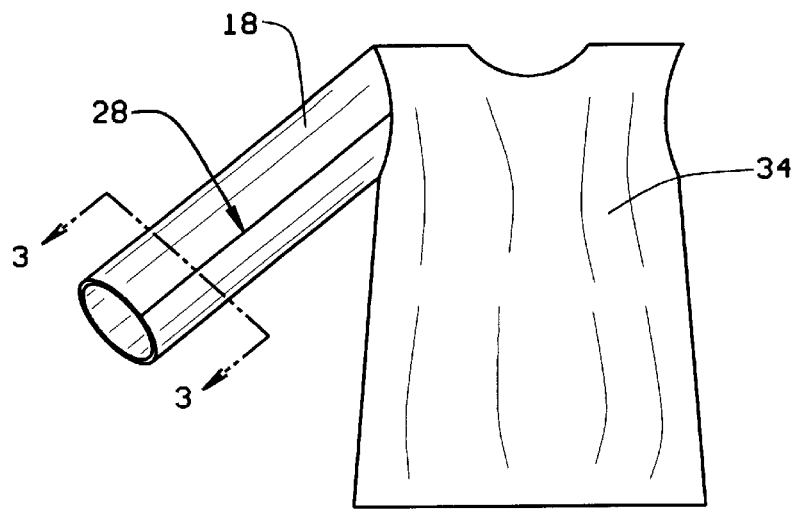
FIG. 1 is a schematic representation of one operative environment of the present invention.
Figure 2:
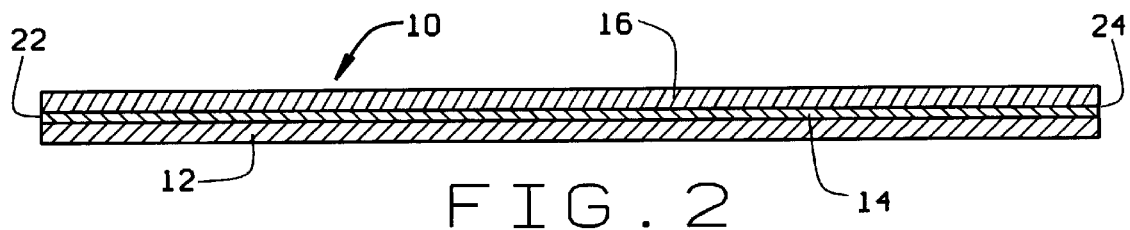
FIG. 2 is a side view of the laminate sheet employed in constructing the seam of the present invention.

Referring to drawing FIG. 2, the seam is constructed from a laminate sheet 10 in the preferred embodiment of the seam. However, the seam may also be constructed from two or more laminate sheets of the type shown in FIG. 2 and yet to be described without departing from the intended scope of the invention. The laminate sheet 10 is basically comprised of a first layer 12 of a polyester fabric, a second layer 14 of a thermoplastic polyurethane coating covering over an outer surface of the polyester fabric 12, and a third layer 16 of a thermosetting polyurethane coating covering over the thermoplastic polyurethane coating of the second layer. The thermoplastic polyurethane polymer coating is used for its ability to prevent liquid penetration and the thermosetting polyurethane polymer coating is used to encapsulate the thermoplastic polyurethane coating within the sheet to prevent the thermoplastic polyurethane from becoming tacky and sticking to itself during sterilization, as will be explained. In the following illustrative example of the method of forming the seam of the invention, the seam is formed in a garment sleeve 18 such as that shown in FIG. 1.

In preparation for applying both the thermoplastic polyurethane coating 14 and thermosetting polyurethane topcoating 16 to the exterior surface of the polyester warp knit fabric 12, the exterior surface of the polyester fabric 12 is brushed to produce a greater surface to bond with the two polyurethane coatings. The thermoplastic polyurethane coating 14 is then applied over the entire brushed exterior surface of the polyester fabric 12 in any conventional manner and is then allowed to cure. After the thermoplastic polyurethane coating 14 has cured, the thermosetting polyurethane coating 16 is then applied over the entire exterior surface of the polyester fabric coated by the thermoplastic polyurethane coating 14 in any conventional manner and the thermosetting polyurethane coating is allowed to cure. The steps in the method of producing the seam of the present invention produce the laminate sheet 10 comprised of the first layer 12 of polyester warp knit fabric, the second layer 14 of thermoplastic polyurethane coating, and the third layer 16 of thermosetting polyurethane coating.

Figure 3:
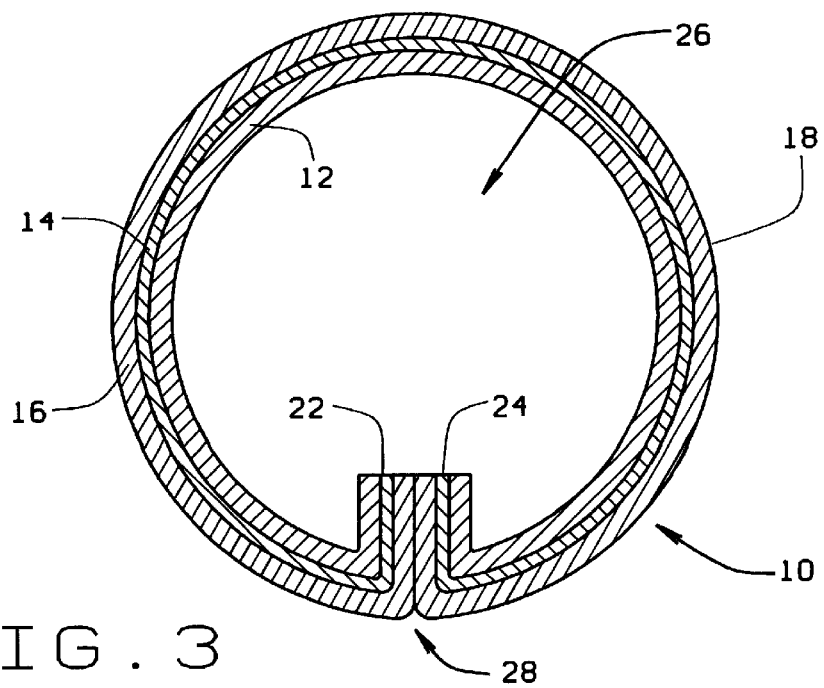
FIG. 3 is a cross section of the seam of the present invention taken along the line 3—3 of FIG. 1.

Following application of the thermosetting polyurethane coating layer 16 to the thermoplastic polyurethane coating 14 of the laminate sheet 10, opposite edges 22, 24 of the laminate sheet are folded back so that the polyester fabric surface of the sheet edges extends outward or away from the remainder of the polyester fabric surface as shown in FIG. 3. These opposite sheet edges 22, 24 are pulled around forming the laminate sheet 10 in a tube configuration shown in FIGS. 1 and 3 with the opposite edges 22, 24 projecting upwardly into an interior 26 of the tube configuration as shown in FIG. 3. In this tube configuration of the laminate sheet, the thermosetting polyurethane coating 16 covering the opposite sheet edges 22, 24 is in mutual contact and the remainder of the thermosetting polyurethane coating covers over the exterior of the tube configuration.

With the laminate sheet held in the tube configuration shown in FIGS. 1 and 3, the seam 28 is subjected to ultrasonic waves from a conventional ultrasonic wave producing device causing the mutually contacting portions of the thermosetting polyurethane coating 16 at the sheet edges 22, 24 to become fused together. In the preferred embodiment of the method of the invention the ultrasonic wave producing device has a titanium horn with a titanium carbide tip. The horn is oscillated at 100 microns, or 100% of its amplitude. The oscillation of the horn produces ultrasonic or mechanical energy waves which heat the polyurethane layers of the seam 28 and bonds the polyurethane of the seam to itself, forming the sealed seam. The ultrasonic welding of the thermosetting polyurethane along the edges 22, 24 forms the mutually contacting portions of the polyurethane coating into a unitary, monolithic fluid-proof seam extending along the length of the sleeve 18. The resulting ultrasonically bonded and sealed seam joins the edges 22, 24 of the laminate sheet together along a seam that is strong to resist its pulling apart and is also impervious to liquids as is the remainder of the sleeve exterior covered by the polyurethane coating 16.

The garment seam constructed according to the method set forth above is both impervious to liquids and is sufficiently strong to stand up to repeated institutional launderings and sterilizations by a conventional autoclaving process where the garment being sterilized is subjected to steam heat of at least 275° F. This enables the garment constructed from the seam of the invention to be repeatedly reused and sterilized by autoclaving. The interior thermoplastic polyurethane layer of the garment seam sandwiched between the polyester fabric and the exterior thermosetting polyurethane layer is impervious to liquids. The exterior thermosetting polyurethane layer encapsulates the interior thermoplastic polyurethane layer within the garment and seam preventing the thermoplastic at different areas of the garment and seam from becoming tacky and sticking to each other when subjected to the steam heat of autoclaving.

It should be appreciated that by variations of the steps involved in practicing the method of the invention described above, liquid impervious seams employed in a variety of different objects may be constructed in a manner similar to the seam 28 of the garment sleeve described above. Furthermore, although the seam of the invention is described as being formed from a single laminate sheet 10, it should also be appreciated that various different types of objects may be formed from a number of laminate sheets comprising the polyester fabric and polyurethane coating described above where each of the laminate sheets are joined by the seam of the invention formed according to the method of the invention to produce these various different objects. Thus, by a skillful bonding of fabric edges one to another as described above, a garment 34 may be constructed. The ultrasonically formed seams may be selectively employed throughout the garment. For example, the seam of the present invention may be employed where the greatest likelihood of extensive fluid saturation would occur, such as at the garment sleeves 18, but not elsewhere in the garment for example on the back. Other, more simplified seam forming methods may be used where the benefits of the seam of the present invention are not required. In addition, the polyester-polyurethane laminate sheet of the invention may be used throughout the garment or alternatively only where the ultrasonic seams of the invention are employed.

This invention is not limited to surgical garments. Other applications such as raincoats, jackets, and similar outerwear as well as tents, outdoor equipment, tarpaulins and the like may employ the invention. Likewise, other types of garments used in other medical areas such as laboratories as well as laundry bags and other such containers also may be made using the seam of the present invention.

While the present invention has been described by reference to a specific embodiment, it should be understood that modifications and variations of the invention may be constructed without departing from the scope of the invention defined in the following claims.

What is claimed is:

1. A stitchless seam that is impervious to liquids, the seam comprising:
   a laminate sheet constructed solely of a polyester fabric on one side of the sheet and a polyurethane coating over the polyester fabric on a second side of the sheet, the sheet having at least one pair of opposite edges;
   the sheet being formed in a tube configuration with the polyester fabric extending around an interior of the tube and the polyurethane coating extending over an exterior of the tube;
   the pair of opposite edges being folded back into the tube interior where the edges are aligned adjacent each other in the interior of the tube and the polyurethane coating on each of the opposite edges being in mutual contact, and wherein the polyurethane coating on each of the opposite edges has been ultrasonically welded securing the edges together and forming a seam along the tube of laminate sheet that both joins the opposite-edges of the sheet together and seals the join of the edges solely by the ultrasonically welded polyurethane coating.

2. The seam of claim 1, wherein:
   the polyester fabric is heat stable up to at least 275° F.

3. The seam of claim 1, wherein:
   the polyurethane coating is heat stable up to at least 275° F.

4. The seam of claim 1, wherein:
   the tube configuration of the sheet and the seam formed therein is autoclavable.

5. The seam of claim 1, wherein:
   the seam is formed in a sleeve of a garment.

6. The seam of claim 1, wherein:
   the polyurethane coating is thermosetting polyurethane.

7. The seam of claim 1, wherein:
   the polyurethane coating includes a layer of thermoplastic polyurethane and a layer of thermosetting polyurethane.

8. A method of forming a stitchless seam that is impervious to liquids, the method comprising:
   constructing a laminate sheet from a piece of polyester fabric, the fabric having a configuration with at least one pair of opposite edges, and covering over one side of the piece of fabric with a polyurethane coating thereby constructing the laminate sheet solely of the polyester fabric on one side of the sheet and solely of the polyurethane coating on a second side of the sheet;
   forming the sheet in a tube configuration so that the polyester fabric extends around an interior of the tube and the polyurethane coating extends over an exterior of the tube;
   folding the opposite edges of the polyester fabric back so that the polyester fabric at the opposite edges is folded back over itself and so that the pair of edges are aligned and extending into the tube interior and the polyurethane coating on each of the edges is in mutual contact; and
   subjecting the contacting polyurethane coating of each of the opposite edges to ultrasonic energy thereby securing the opposite edges together and forming a seam along the laminate tube that both securely joins the opposite edges of the sheet together and seals the join of the edges solely by the ultrasonically welded polyurethane coating in mutual contact at the opposite edges.

9. The method of claim 8, further comprising:
   using a polyester fabric that is heat stable up to at least 275° F. in constructing the laminate sheet.

10. The method of claim 8, further comprising:
    using a polyurethane coating that is heat stable up to at least 275° F. in constructing the laminate sheet.

11. The method of claim 8, further comprising:
    forming the seam to be autoclavable.

12. The method of claim 8, wherein:
    the polyurethane coating is thermosetting polyurethane.

13. The method of claim 8, wherein:
    the polyurethane coating includes a layer of thermoplastic polyurethane and a layer of thermosetting polyurethane.

14. The method of claim 8, further comprising:
    forming the seam in a sleeve of a garment.

15. A stitchless seam that is impervious to liquid, the seam comprising:
    a pair of adjacent pieces of a polyester fabric, each piece of fabric having opposite interior and exterior surfaces and each piece of fabric having an edge that is folded back so that the edge extends out from the interior surface of the piece of fabric;
    a polyurethane coating on the exterior surface of each piece of fabric, the polyurethane coating on the exterior surfaces of the folded back edges being in mutual contact, and the mutually contacting polyurethane coating being ultrasonically welded thereby securing the folded back edges together forming a seam in the pieces of fabric that both joins the edges of the two pieces of fabric together and seals the join of the edges solely by the ultrasonically welded polyurethane coating.

16. The seam of claim 15, wherein:
    the polyurethane coating is thermosetting polyurethane.

17. The seam of claim 15, wherein:
    the polyurethane coating includes a layer of thermoplastic polyurethane and a layer of thermosetting polyurethane.

18. The seam of claim 15, wherein:
    the interior surfaces of the pieces of polyester fabric are interior surfaces of a garment sleeve and the polyurethane coating covers an exterior surface of the sleeve.

19. The seam of claim 15, wherein:
    the seam is heat stable up to at least 275° F. enabling the seam to withstand steam sterilization and repeated institutional laundering.

20. The seam of claim 17, wherein:
    the thermosetting polyurethane layer is substantially less tacky than the thermoplastic polyurethane layer when subjected to steam sterilization, the thermoplastic polyurethane layer being positioned between the fabric and the thermosetting polyurethane layer, thereby encapsulating the thermoplastic layer and preventing the thermoplastic polyurethane layer from sticking to itself during steam sterilization.

21. The seam of claim 15, wherein:

one of the pair of pieces of fabric defines a first portion of a sheet of polyester fabric, and the other one of the pair of pieces of fabric defines a second portion of the sheet of polyester fabric.

22. The seam of claim 15, wherein:

the polyurethane coating is thermoplastic polyurethane.

23. The method of claim 13, wherein:

the thermosetting polyurethane layer is substantially, less tacky than the thermoplastic polyurethane layer when subjected to steam sterilization, the thermoplastic polyurethane layer being positioned between the fabric and the thermosetting polyurethane layer, thereby encapsulating the thermoplastic layer and preventing the thermoplastic polyurethane layer from sticking to itself during steam sterilization.

24. The method of claim 8, wherein:

the polyurethane coating is thermoplastic polyurethane.

25. The seam of claim 7, wherein:

the thermosetting polyurethane layer is substantially less tacky than the thermoplastic polyurethane layer when subjected to steam sterilization, the thermoplastic polyurethane layer being positioned between the fabric and the thermosetting polyurethane layer, thereby encapsulating the thermoplastic layer and preventing the thermoplastic polyurethane layer from sticking to itself during steam sterilization.

26. The seam of claim 1, wherein:

the polyurethane coating is thermoplastic polyurethane.

27. An autoclavable fabric that is impervious to liquids, the fabric comprising:

a sheet of polyester fabric;

a layer of thermoplastic polyurethane; and a layer of thermosetting polyurethane, the thermosetting polyurethane layer being substantially less tacky than the thermoplastic polyurethane layer when autoclaved, the thermoplastic polyurethane layer being positioned between the fabric and the thermosetting polyurethane layer, thereby encapsulating the thermoplastic polyurethane layer and preventing the thermoplastic polyurethane layer from sticking to itself during autoclaving.

* * * * *